United States Patent
Zeng et al.

(10) Patent No.: US 9,866,565 B2
(45) Date of Patent: Jan. 9, 2018

(54) METHOD AND APPARATUS FOR CONTROLLING DATA PERMISSIONS

(71) Applicant: Alibaba Group Holding Limited, Georgetown, Grand Cayman (KY)

(72) Inventors: Yunxi Zeng, Hangzhou (CN); Yong Long, Hangzhou (CN); Dejin Zhu, Hangzhou (CN)

(73) Assignee: Alibaba Group Holding Limited, Grand Cayman (KY)

(*) Notice: Subject to any disclaimer, the term of this patent is extended or adjusted under 35 U.S.C. 154(b) by 156 days.

(21) Appl. No.: 14/881,882

(22) Filed: Oct. 13, 2015

(65) Prior Publication Data

US 2016/0191535 A1 Jun. 30, 2016

(30) Foreign Application Priority Data

Oct. 13, 2014 (CN) .......................... 2014 1 0539139

(51) Int. Cl.
*H04L 29/06* (2006.01)
*G06F 17/30* (2006.01)
*G06F 21/62* (2013.01)

(52) U.S. Cl.
CPC ...... *H04L 63/102* (2013.01); *G06F 17/30551* (2013.01); *G06F 17/30604* (2013.01); *G06F 21/6218* (2013.01)

(58) Field of Classification Search
CPC . G06F 17/30; G06F 17/00; G06F 7/00; G06F 15/16; G06F 3/0481; G06F 17/30551; G06F 17/30604; G06F 21/6218; G06F 17/30306; G06F 21/6227; G06F 17/30312; G06F 17/30292; G06F 17/30321; H04L 63/102; H04L 63/105; H04L 63/20; H04L 63/10; H04W 28/08
USPC .................. 726/3, 6; 707/761, 785, 999.002, 707/999.003, 999.004, 999.009, 999.1, 707/708, 755, 756, 791, 802, 822, 828, 707/999.103, E17.055; 705/7.11;
(Continued)

(56) References Cited

U.S. PATENT DOCUMENTS 6,112,304 A 8/2000 Clawson
7,076,493 B2 7/2006 Myers et al.
(Continued)

FOREIGN PATENT DOCUMENTS

CN 1992767 7/2007
CN 101196971 6/2008
(Continued)

*Primary Examiner* — Thanhnga B Truong (57) ABSTRACT

Methods and apparatus for controlling data permission are disclosed herein, and embodiments include generating a relational database that includes entity objects, corresponding user identifications and obligatory relationships of corresponding permission information. The obligatory relationships include time interval information. Some methods further include receiving a request to access an entity object, and the access request comprises identification of an accessing user and an accessing timestamp. The method further includes rendering the permission information of the corresponding entity object if the identification of the accessing user is substantially similar to the corresponding identification of the entity object and the accessing timestamp is within the time interval in response to the accessing request.

45 Claims, 2 Drawing Sheets

(58) Field of Classification Search
USPC .......... 706/45; 709/217, 203, 219, 238; 715/763; 455/453
See application file for complete search history.

(56) References Cited

U.S. PATENT DOCUMENTS

| | | | |
|---|---|---|---|
| 7,185,067 B1 * | 2/2007 | Viswanath | H04W 28/08 |
| | | | 455/453 |
| 7,490,099 B2 | 2/2009 | Myers et al. | |
| 7,587,410 B2 | 9/2009 | Sourov et al. | |
| 7,705,735 B2 | 4/2010 | Pape et al. | |
| 7,714,729 B2 | 5/2010 | Pape et al. | |
| 7,747,647 B2 * | 6/2010 | Canning | H04L 63/10 |
| | | | 707/756 |
| 7,797,342 B2 | 9/2010 | Banks et al. | |
| 8,024,317 B2 | 9/2011 | Nair et al. | |
| 8,121,999 B2 | 2/2012 | Hansen et al. | |
| 8,478,722 B2 | 7/2013 | Lee et al. | |
| 8,498,994 B2 | 7/2013 | Prabaker et al. | |
| 8,510,264 B1 | 8/2013 | Tamm et al. | |
| 8,515,936 B2 | 8/2013 | Hansen et al. | |
| 8,549,047 B2 | 10/2013 | Beechuk et al. | |
| 8,560,554 B2 | 10/2013 | Gradin et al. | |
| 8,560,575 B2 | 10/2013 | Gradin et al. | |
| 8,639,712 B2 * | 1/2014 | Schmeink | G06F 17/30312 |
| | | | 705/7.11 |
| 8,661,076 B2 | 2/2014 | Herman | |
| 8,732,150 B2 | 5/2014 | Gradin et al. | |
| 8,738,620 B2 | 5/2014 | Lee et al. | |
| 8,762,251 B2 | 6/2014 | Doherty et al. | |
| 8,805,879 B2 | 8/2014 | Kelley et al. | |
| 8,892,573 B2 | 11/2014 | Gradin et al. | |
| 8,903,770 B2 | 12/2014 | Kucera | |
| 8,935,753 B1 | 1/2015 | Cha et al. | |
| 9,031,957 B2 | 5/2015 | Agrawal et al. | |
| 9,058,363 B2 | 6/2015 | Dunn et al. | |
| 9,087,098 B2 | 7/2015 | Lin et al. | |
| 9,106,761 B2 | 8/2015 | Hersh | |
| 9,152,671 B2 | 10/2015 | Lin et al. | |
| 9,152,672 B2 | 10/2015 | Lin et al. | |
| 9,152,947 B2 | 10/2015 | Sherman et al. | |
| 9,235,614 B2 | 1/2016 | Beechuk et al. | |
| 2006/0137007 A1 | 6/2006 | Paatero et al. | |
| 2008/0162544 A1 * | 7/2008 | Weissman | G06F 17/30292 |
| 2016/0105409 A1 * | 4/2016 | Torman | H04L 63/105 |
| | | | 726/6 |

FOREIGN PATENT DOCUMENTS

| | | |
|---|---|---|
| CN | 102638473 | 8/2012 |
| JP | 2006065626 | 3/2006 |

* cited by examiner

METHOD AND APPARATUS FOR CONTROLLING DATA PERMISSIONS

CROSS REFERENCE TO RELATED APPLICATION

This application claims the benefits to Chinese Patent Application No. 201410539139.3, filed on, Oct. 13, 2014, which is incorporated herein by reference in its entirety.

TECHNICAL FIELD

Embodiments of the present disclosure generally relates to the field of data processing. More specifically, embodiments of the present invention relate to methods and apparatus for controlling data permissions.

BACKGROUND

Due to an increasing number of users and the emergence of new web technologies (with an emphasis on user-generated content (e.g., Web 2.0), many websites and web services currently experience a very high rate of requests for data and services and need to support concurrent access to a very large number of users.

There are typically two types of concurrent access: strict concurrent access and general concurrent access. For strict concurrent access all users are working on similar matters or performing similar operations simultaneously. The types of operations performed by the users comprise similar types of tasks. For general concurrent access, multiple users are able to send requests to the system and are able to conduct operations. In this case, the requests and the operations performed by the multiple users can be the same or different. However, in either case, from the perspective of the overall web system, the multiple users conducting operations are viewed in the same manner as a general concurrent access. The latter case, where multiple users are conducting different operations, better reflects the way in which applications are typically used by multiple users.

When there is an increase in the number of the concurrent users in a system, a response time to a request from a user is increased. This is especially true when the number of the concurrent users exceeds certain thresholds. Further, when there is a large number of concurrent users and in turn a large number of requests which are submitted to a server, there is a greater likelihood of the server freezing or the system failing because of an overload.

The present disclosure provides mechanisms to control data permissions to ease the burden on the server when receiving higher than normal requests and improve performance of the server while preventing server failures during operation.

SUMMARY

The present disclosure provides a method for controlling data permissions to further ease the burden on a server and to improve the performance of the server.

Accordingly, the present disclosure provides an apparatus for controlling data permissions to improve performance of the server. The apparatus includes a generator configured to generate the relational database, where the relational database comprises entity objects, user identifications and permission information comprising obligatory relationship, where the obligatory relationships comprise time interval information, a receiver coupled to the generator configured to receive a request to access an entity object, where the request comprises an identification of an accessing user and an access timestamp, and a processor coupled to the receiver configured to provide the permission information of the entity object when the identification of the accessing user is substantially similar to a corresponding identification of the entity object and the access timestamp is within the time interval in response to the access request.

According to an exemplary embodiment of the present disclosure, a method of controlling data permissions is disclosed and includes generating a first relational database, where the first relational database comprises entity objects, user identification information and permission information comprising obligatory relationships and time intervals associated with the obligatory relationships, receiving a request to access a first entity object, where the access request comprises an identification of an accessing user and an access timestamp, and creating a first permission information for the first entity object in accordance with the accessing request when an identification of the accessing user is substantially similar to the user identification information of the entity object and the accessing timestamp is within a first time interval of the entity object.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Figure 1:
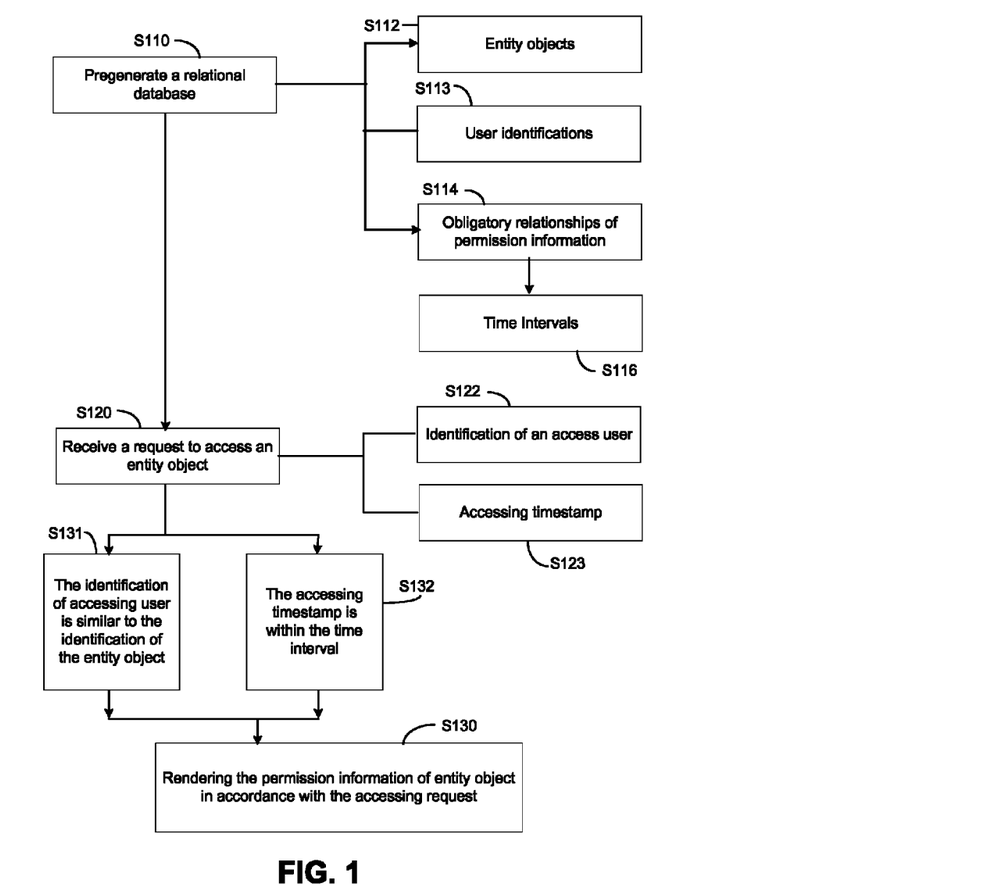
FIG. 1 is a flow diagram of an exemplary method for controlling data permissions according to embodiments of the present disclosure.

FIG. 1 depicts an exemplary method for controlling data permissions according to embodiments of the present invention.

In step S110, a relational database is pre-generated. The relational database is coupled to entity objects S112, corresponding user identifications S113, and obligatory relationships of corresponding permission information S114. The obligatory relationships include time intervals information S116.

An entity object may be considered an abstraction of a specific business entity. More generally, an entity object may be any entity which is describable to an individual. For example, common entity objects include a person, a street, an automobile, or various kinds of products and goods. Each entity object can be also described using various types of attribute information. For example, when an entity object is a person, the typical attribute information used to describe the person may include the person's age, height, weight and/or ethnicity. If the entity object is a product, the typical attribute information used to describe the product may be the product's price, color and/or material.

According to some embodiments of the present invention, entity objects are objects which meet predefined conditions. These entity objects may be determined using the following steps:

In step S1, initially a module includes a rule for calculating an index and determining conditions. The module may be a data module or an abstraction of characteristics of data, for example. The module may also comprise information that defines how to input and output data. The module can be initialized by calculating an index and determining conditions associated with the calculations using predetermined rules. Rules for calculating an index are used to calculate index data for a specific entity object. The entity object may include entities associated with a click-through-rate of a product, market interest in the product or comparable products, and/or prices and associated cost-efficiency, for example. The conditions used in determining calculations are limitations of the index data. For example, one condition may occurs when a click-through-rate for a product surpasses certain threshold.

Furthermore, there are numerous different rules for calculating an index for different index data. For example, an index of market interest in a product can be produced by weighing a search index of a search engine such as "weibo", for example. The competitiveness of a product's attribute can be determined by weighing the sum of the product's key attribute indexes (such as brands, number of cores of CPU, memory, screen sizes and capacities, etc.) and any corresponding indexes. By forming relationships between variables and using the rules associated with calculating the index and further defining additional rules for individual scenarios, different kinds of index data can be calculated and synergies can be determined when generating data models. In other words, the modeling approaches are flexible and can easily be modified according to embodiments of the present disclosure.

At Step S2, a set of candidate entity objects which may include attribute information of the candidates of the entity objects are produced.

The set of candidate entity objects may include multiple candidates of entity objects and corresponding attribute information. The set of candidate entity objects may be produced using algorithms in a database or can be derived from user-submitted information. For example, a user may submit information relating to multiple products and from such information a set of candidate entity objects is derived.

At Step S3, targets of each candidate of the entity object in the set of candidates associated with corresponding attribute information are calculated using the rules for calculating the index with the corresponding index data.

At step S4, the candidate entity objects having index data which has been determined to meet the predefined conditions are selected as the entity objects.

Modules may be generated using generation rules which are established for calculating indexes and for determining conditions. After a module has been generated, index data for each candidate in the set of candidate entity objects is then calculated using calculating rules of the index which have been included in the module. For index data of a candidate entity object which has been selected from the set of candidate entity objects and meet the determined conditions, the candidate entity object selected can be established as the entity object. For example, if a current product is considered, the current product may be determined to be a scarce product for a set of products in a market using the exemplary process just described. In this example, scarcity may be defined as a resource which is related to an increase in need/desire for this resource in a certain time and geographic area. As such, the availability of these products that are scarce products would be limited in the certain area and the ability to produce there scarce produces is also limited. One example of a scarce product is limited editions of mobile phones of a certain brand. Also, limited editions of clothes of a certain brand would also be considered scarce products in a market of clothes. The data module which includes the rules to calculate the index and to determine and establish a first set of conditions by analyzing and deriving information from a set of key attribute indexes. The type of attribute indexes used is limitless. For example, attribute indexes can relate to product brands, and attribute indexes can relate to product features such as the number of cores of a CPU, the size and type of memory used in a product, the prices of the products, the consumer interest/demand associated with the product, etc. Multiple product candidates may be obtained from these product indexes. As one example, a set of product candidates may be obtained by calculating data indexes of market interest and competitiveness of each of the candidate products by the module, and depending on the results of the calculations of the data indexes for each of the product candidates, the product candidates can be identified as scarce products in the market. In other words, if the index data of a product candidate meets a set of conditions for scarcity using the calculations, the product is considered a scarce product is in the market.

A set of permission information corresponding to an entity object is saved with the entity objects in a database of related permissions and includes the rights that allow targeting, opening, modifying, and/or accessing the entity object. The rights may include permissions to access the entity object in a limited manner, permission to freely use the entity object, and/or other specific permissions. For example, the rights for a scarce product in a market may include permission information for purchasing the scarce product, permission to freely use the product, and permission to use certain functions of the scarce product, for example. Certain functions may include using a VIP skin or interface for free for one year or other limited time offers, for example. Other permissions available may include access to a free shipping service for the scarce produce, a permission to use multiple discounts when purchasing the scarce product, and a permission to obtain free samples of the scarce product. These are simply exemplary descriptions of the permission information. The permission information may be personalized according to the needs of users and there are no limitations on such permission information according to embodiments of the present disclosure.

According to some embodiments of the present disclosure, permission information may comprise an associated identification code (e.g., TAG_ID). The identification code can be a code that identifies permission information associated with an entity object. An example of a possessed identification code is a tag that indicates free shipping. The identification code can be generated using an algorithm determined by the module, and permission information is assigned to the identification code when the identification code is generated. Allocating permission information in this manner enables the generated permission information to be associated with a specific identification code.

A user identification of an entity object (e.g., USER_ID) allows a user to use the permission information of the entity object. According to some embodiments of the present disclosure, user identification is determined by a series of steps. The first step includes receiving a request to obtain data for multiple identification codes. Multiple requests may be received, and the requests may include the identification of a user or users that made the request. The second step includes randomly selecting identification information from a user request and setting the identification code as an initial user identification. After the related permission information has been associated with the identification codes, a set of associated permission information is generated. This allows each of the identification codes identified to be coupled to the obligated user identification when the user identification is randomly generated. Other methods of randomly generating user identification codes includes importing a group of identification codes from a data file. After the identification codes are imported, a registering user can reserve an identification from the data file and associate the identification with the user so that the user can use the identification code when the user makes a request for data or the like. When making a request for data, the user can submit the identification of the user as the identification is now associated with the user or the request. This also enables a reference to the registered user to be generated. The identification of a requesting user may also be randomly selected using an algorithm selected by the module, and the module can also select multiple identifications for a set of user requests and establish each of the user identification in the set. Other methods to determine user identifications besides random selection include interactive games that require a user to play in order to obtain user identification. In such interactive games, the identification code will be coupled/obligated to the user who wins the interactive game. Another way to associate identification codes with a user includes determining the user identifications by a combination of methods already described. One such combination is described in the following example, where reservation codes of purchases made hastily is generated from imported data. The user is able to access the imported data by clicking on a button of an interface. The user is instructed to fill out a form comprising personal information (e.g., phone number, address, etc.) and other questions requiring answers from the user in response to the user clicking the button. Upon the completing the form, the user is able to purchase a randomly drawn reservation code, and the reservation code is associated with the user if the user were to win the random drawing.

According to some embodiments of the present disclosure, identification codes of entity objects may include multiple identification codes, and a series of steps is used to determine the first identification code to be used. In step S11, a first identification code is generated, and an entity object is associated with the first identification code. At step S12, permission information is allocated to the first identification code. At step S13, an identification of a user is determined. At step S14, an obligatory relation is generated resulting from the association between the first identification code and the determined user identification to create a relational database.

In one embodiment of the present disclosure, there can be one or more identification codes initially created for the entity object. After at least one of the initial identification codes is generated using a preset algorithm, a first identification code (e.g., TAG_ID) will be associated with an entity object (e.g., ITEM_ID), and the permission information will be allocated with the first identification code according to the identification code of the entity object. For example, if a certain product comprises permissions or privilege policies such as free shipping and a free lottery drawing attached to the purchase of the product, there will be two reservation codes for the product. One of the reservation codes is associated with the free shipping service, and the other reservation code is associated with the free lottery policy attached to the purchase of the product. Once user identification (e.g., USER_ID) of a user is determined, the user will be associated with the identification codes. The user identification will be associated with the permissions of the identification codes that have been allocated. In other words, obligatory relationships result from the connections generated between the first identification code, the entity object, the permission information, and the user identification. Once the generation of the obligatory relationships/connections has been substantially completed, the relationships will be organized in the form of a relational database. An entity object is already determined when the initial identification codes are created and associated with the entity object.

The generation of the obligatory relationships between the user identification and the initial identification codes may be in response to a user manually associating the user identification with the initial identification codes or to the uses activating an association operation. For example, a user can associate a first identification code with user identification by activating a channel of the initial identification code. The steps of generating the obligatory relationships include receiving a request for targeting the first identification code, and associating the first identification code with the user identification based on the request to create an obligatory relationship. The obligatory relationship may be stored as part of a relational database. And finally, an "obligated" tag will be added to the first identification code. For example, when a user clicks a button to enter a webpage where the association with the identification codes is to be established, the user inputs an identification code and determines an entity object that is to be associated with the identification code. When the user clicks an interface button (e.g., a "bind" button), the obligatory relationship between the first identification code and the user identification will be generated, and the first identification code that is obligated to the user identification will be tagged as "obligated".

According to some embodiments of the present disclosure, an identification code may include a second identification code different than a first identification codes. A series of steps is performed to generate a relationship between an entity object and multiple identification codes. At step S21, a second identification code, different than a first identification code, is generated. At step S22, permission information is generated and associated with the second identification code. At step S23, a user identification is determined. At, step S24 the second identification code is associated with the user identification. At step S25, an entity object is selected from multiple entity objects according to the user identification which has been determined. At step S26, a relationship is generated resulting from the obligatory relationship between the selected entity object and the second identification code and stored as a relational database.

According to some embodiments, when a second identification code is generated, the entity object has not yet been determined. An entity object is selected from multiple entity objects when an entity object is selected for the second identification code and the obligatory relationship is generated between the second identification code and the selected entity object. A second identification code is generated, and permission information is allocated to the second identification code. When the user identification has been determined, the second identification code will be obligated to the user identification.

The generation of the obligatory relationship between the user identification and the second identification code is performed in response to user input that associates or activates the obligatory relationship. A user can bind the second identification code to the user identification by activating a channel of the second identification code. Specifically, the steps of generating the obligatory relationships include receiving a request for obligatory targeting at the second identification code. The second identification code will then be obligated to the user identification and the obligatory relationship between the second identification code and the user identification will be generated in response to the request. The association between the second identification code and the user identification may be stored as a relational database. An "obligated" tag is associated with the second identification code. The obligatory relationship between the second identification code and the selected entity object is generated when a user has selected an entity object. The obligatory relationships between the second identification code, the entity object, the permission information, and the user identification will be generated afterwards, and all the obligatory relationships will be organized to further generate the relational database. For example, a user may obtain a second identification code and select a certain product having at least one available unit from a pool of products. The user may then click an interface button to open a webpage where the user can input an identification code and designate a product or an entity object that is to be associated with the identification. The obligatory relationship between the second identification code and the user identification is generated, and the second identification code that has been obligated to the user identification will be tagged as "obligated".

Before the user identification is obligated to the identification code, a user identification that has already obtained an identification code may transfer possession of the identification code. According to some embodiments of the present disclosure, the user first receives a request to transfer the possession of the first or second identification code of the user identification before associating the first or second identification code with the user identification. The transfer request includes the user identification of the transferor that is transferring possession of the first or second identification code, or the associated permission information, and the user identification of the transferee that is accepting possession of the first or second identification code, or the associated permission information. In response to the transfer request, the current user identification will be updated as the user identification of the transferee that is accepting possession of the first or second identification code or the associated permission information.

After the user identification of the transferor who has transferred the possession of the identification code has been determined, the user identification of the transferee that is accepting the possession of the identification code will be set as the user identification. After the request to bind the current user identification is received, an obligatory relationship is formed between the current user identification and the identification code.

Because there may be multiple events related to one entity object with multiple obligatory relationships, in order to distinguish the multiple obligatory relationships associated with one entity object, time interval information (e.g., a time stamp) may be associated with each obligatory relationship. The time intervals set a limit in the form of a valid date or a valid time period for the user identification to use the permission information after which the relationship expires.

The time interval information may comprise a MM/DD/YYYY format, which means that a certain reservation code may only be used on that date. Relationships between the permission information, the user identification, the entity object and the corresponding time interval information may be stored in a rational database.

A user can perform operations such as querying, adding, amending, or deleting data in the relational database. For example, a user can query the permission information of certain user identification, query a list of the identification codes of certain user identification, delete, amend, add or delete components of permission information for specific users based on user identification.

According to some embodiments, a computer implemented process for verifying permission for an entity object is disclosed. At step 120, a request to access an entity object is received from a user (e.g., an "accessing user"). The access request includes an identification of an accessing user S122 and as an access timestamp S123.

There may be multiple access requests for access to each of the entity objects at the client side. The access requests include an identification of the accessing user and the access timestamp. For example, many e-commerce platforms/websites enable a user to purchase a certain product by clicking the name or image of the product. In response, an access request is generated comprising the identification of the accessing user and the timestamp of the clicking operation that initiated the purchase.

Time interval information associated with each entity object may be monitored. When the time being monitored is within a preset time period before the starting point of the time interval, a notice of the starting point of the time interval can be generated by a system according to the entity object and displayed to the user associated with the user identification. At the time of the starting point of the time interval, the user will be notified that the time interval associated with the entity object that has been obligated to the user identification is starting. The preset time period can be any time interval, such as a day or an hour earlier than the starting point of the time interval. For example, when a certain product is first made available, the user identification associated with the product will be notified by a notice generated and sent by a system to inform the user associated with the user identification that the selling of the product is starting.

At step S130, permission information of a corresponding entity object is opened in accordance with the access request if the identification of the accessing user is substantially similar to the corresponding identification of the entity object S131 and the access timestamp is within the time interval S132.

When the identification of the accessing user is substantially similar to the corresponding identification of the entity object and the access timestamp is within the time interval, the current user can use the permission information associated with the entity object. At this point, the permission information of corresponding entity object is opened in accordance with the access request. If the identification of the accessing user is not substantially similar to the corresponding identification of the entity object, the permission information of corresponding entity object will fail.

According to some embodiments of the present disclosure, when it is detected that a current user possesses access permission to a certain entity object in a certain time period, the user is allowed to access the entity object within that time period. When it is determined that the current user does not possess valid access permissions in the time period, the user is not allowed to access the entity object within that time period. For example, if a user possesses a purchasing permission of a certain product in a certain time period, the user is allowed to purchase the product within that time period. If a user does not possess the purchasing permission of a certain product in the time period, the user is not allowed to purchase the product within that time period.

When the user is allowed to access a certain entity object in a certain time period, other permission information may be granted to the user during that time period, such as a free shipping service for the entity object or product.

When the permission information of a corresponding entity object is opened, or when time interval information is in a timeout mode, the obligatory relationships between the entity object, the corresponding user identification, and the corresponding permission information will be revoked/discharged. Specifically, after the usage of the permission information is finished, or after the time interval is over, the obligatory relationships between the entity object, the corresponding user identification, and the corresponding permission information can be revoked in the relational database. There are multiple manners to revoke the relationships such as deleting the record or changing the "obligated" tag to an "un-obligated" or null tag.

By generating the obligatory relationships between the entity object, the corresponding user identification, and the corresponding permission information, the permissions associated with each user identification can be determined. When an access request to an entity object has been received, and in accordance with the relationships between the user identification the permission information and the entity object, a decision as to whether the corresponding user identification in the access request possesses the necessary permission to use the corresponding permission information can be detected. Locating the entity object in this way avoids a large number of data accesses by a large amount of users, thereby reducing the burden on the sever to process data. This improves the processing efficiency of the server, increases server performance, and improves the transfer rate of the entity objects.

Figure 2:
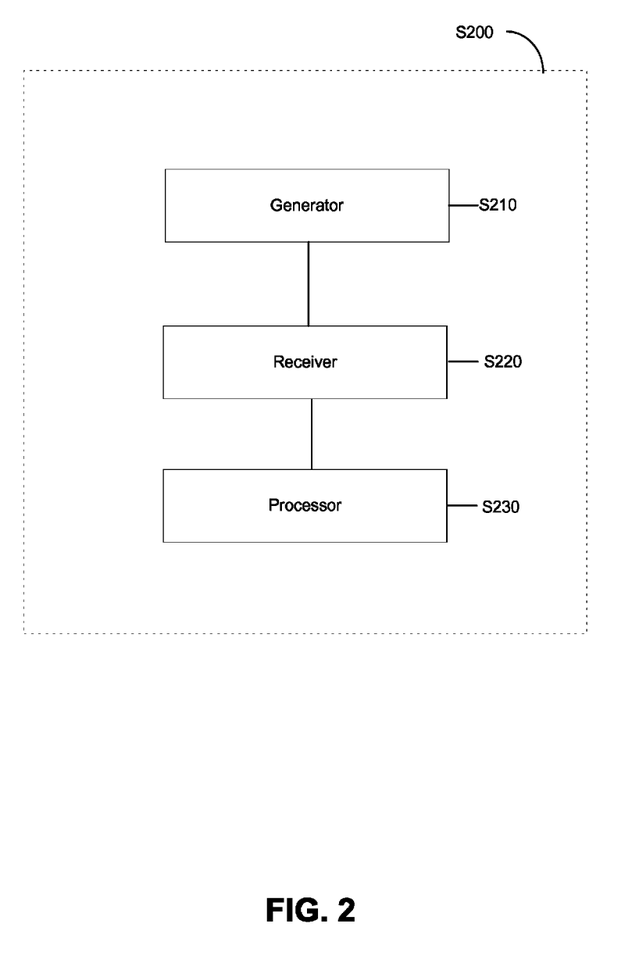
FIG. 2 is a block diagram of an exemplary apparatus for controlling data permissions according to embodiments of the present disclosure.

FIG. 2 depicts an exemplary device for controlling data permission according to embodiments of the present invention.

Block S210 is a generator that generates a relational database. The relational database may include entity objects, corresponding user identifications, and obligatory relationships of corresponding permission information. The obligatory relationships may include time interval information of entity objects.

Block S220 is a receiver that receives a request to access an entity object. The access request includes an identification of an accessing user and an access timestamp.

Block S230 is a processor that opens permission information of corresponding entity objects in accordance with the access request when the identification of the accessing user is substantially similar to the corresponding identification of the entity object and the access timestamp is within the time interval of the entity object.

According to some embodiments of the present disclosure, the permission information includes access permissions, and the processor S230 further includes a second processor to open the access permission of the entity object according to the access request when the identification of the accessing user is substantially similar to the corresponding identification of the entity object and the access timestamp is within the time interval.

According to some embodiments of the present disclosure, one or more preset initial identification codes are associated with the entity objects. The generator S210 further includes a generator that generates a first identification code where the first identification code is associated with an entity object, an allocator that allocates permission information to the first identification code, a processor that determines a user identification, and an obligator to bind the first identification code with the user identification and generate a relationship between them. The processor or obligator may also store the relationship in a relational database.

According to some embodiments of the present disclosure, the obligator further includes a receiver that receives a request to bind the first identification code. The obligator binds the first identification code with the user identification in accordance with the obligatory request to generate the relationship between them and to generate a relational database comprising the relationship. A processor adds an "obligated" tag to the first identification code.

According to some embodiments of the present disclosure, multiple identification codes are initially associated with permission information. Generator S210 further includes a second generator that generates a second identification code and allocates permission information to the second identification code. A processor determines a user identification and an obligator binds the user identification with the second identification code. A selector receives an entity object selected from multiple entity objects for the user identification, and a generator binds the selected entity object with the second identification code and stores the relationship in a relational database.

According to some embodiments of the present disclosure, a processor for determining a user identification comprises a receiver that receives multiple requests to obtain data associated with a first identification code. The requests to obtain data include an identification of the requesting users and a selector to randomly select an identification of requesting user to be set as the user identification.

According to some embodiments of the present disclosure, the processor for determining the user identification further includes a receiver that receives multiple requests to obtain data of the second identification code. The requests to obtain data include identification of the requesting users, and a selector that randomly selects an identification of a requesting user to be used as the user identification.

According to some embodiments according to the present disclosure, a receiver receives the transfer request before associating the first identification code with the user identification. The transfer request may comprise a request to transfer the possession of the first identification code including the user identification of the transferor that is transferring the possession of the permission information, associated permission information from the user identification, and/or the user identification of the transferee that is accepting the possession of the permission information. An updater updates the current user identification using the user identification of the transferee that is accepting the possession of the permission information in response to the transfer request.

According to some embodiments of the present disclosure, a receiver to receives a request to transfer the possession of the second identification code from the user identification before associating the second identification code with the user identification. The transfer request includes the user identification of the transferor that is transferring the possession of the permission information, and the user identification of the transferee that is accepting the possession of the permission information. An updater updates the current user identification using the user identification of the transferee that is accepting the possession of the permission information in response to the transfer request.

According to some embodiments of the present disclosure, the device for controlling data permission comprises multiple processors. A first processor creates, identifies, and/or modifies entity objects. The processor comprises a generator that creates a module for identifying entity objects, and the module includes rules for calculating an index and determining conditions.

A processor obtains a set of candidate entity objects comprising associated attribute information. A calculator calculates targets for each candidate entity object based on the corresponding attribute information and an index calculation rule. A candidate entity object comprising data (e.g., index data) that substantially conforms to the determined conditions is assigned to the corresponding index.

According to some embodiments of the present disclosure, a generator generates a notice regarding a starting time of a time interval at a preset time relative to the starting point of the time interval for an entity object. A sender sends the notice about the starting time of the time interval to the user associated with a user identification.

According to some embodiments of the present disclosure, the device for controlling data permission comprises a discharger that discharges/revokes obligatory relationships of entity object after opening the corresponding permission information of the entity objects using an access request or when a time interval is in a timeout mode. The discharger may further discharge the corresponding user identification and the corresponding permission information.

The descriptions of the devices according to embodiments of the present invention are similar to the descriptions of the methods described above, and similar elements can be cross-referred in the descriptions of the methods.

The descriptions of the present disclosure describe embodiment progressively. The focus of each embodiment is on the differences between embodiments, and the similar parts can be cross-referred.

It is appreciated that those skilled in the art understand the present disclosure can take the form of methods, apparatus and computing programming products. Thus, using hardware, software, or a combination hardware and a software can embody the present disclosure. Moreover, embodiments of the present disclosure can use a non-transitory computer readable storage medium or other programmable data terminal equipment having embedded therein program instructions (e.g., a magnetic storage disk, a CD-ROM or an optical storage device).

In a typical configuration, the computing system includes one or more central processing units (CPUs), an input/output port, an Internet port and a memory. The memory includes volatile memories, the random-access memory (RAM), and/or non-volatile memories such as read-only memory (ROM) and flash RAM in computer readable mediums. A memory is an example of computer readable medium. The computer readable mediums include volatile and non-volatile memories, transferable and non-transferable media, and storage of information can be accomplished by multiple methods and techniques. The information can be computer readable commands, data structures, programming modules and other data. The readable mediums disclosed include but are not limited to phase-change memory (PRAM), static random-access memory (SRAM), dynamic random-access memory (DRAM), other types of the random-access memory (RAM), read-only memory (ROM), electrically erasable programmable read-only memory (EEPROM), flash RAM and other memory technologies, compact disc read-only memory (CD-ROM), digital video disc (DVD) and other optical storage, magnetic tape, magnetic disc and other magnetic storage and any other non-transition media.

In embodiments of the present disclosure, the method, the terminal devices (systems) and computer-implemented steps are described in the flow diagrams and the block diagrams. It should be understood that the embodiments of each step/block in a flow/block diagram and the combinations of each step/block in a flow/block diagram can be accomplished by executing commands or instructions of a computer program. The computer-implemented steps can be used by computers, dedicated computers, embedded processors and processors of other programmable data processing terminal devices to form a device having the capability to execute the functions of one or more steps/blocks in a flow/block diagram.

The commands of the computer programs can be stored in computer readable mediums that can cause computers or other programmable data processing terminal devices to function in a certain way, to enable the commands of the computer programs produce products that contain the device. The commands are embodied in one or more steps/blocks in a flow/block diagram.

The commands of computer programs can also be loaded on computers and other programmable data processing terminal devices to let the computers and other programmable data processing terminal devices execute a series of operation steps to produce the embodiments. The commands are described by one or more steps/blocks in a flow/block diagram.

In the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" do not exclude a process, method, article, or apparatus that comprises such elements from including other same elements.

The present disclosure provides a method and apparatus for controlling data permissions. While the present disclosure has been described using particular embodiments, it should be appreciated that the disclosure should not be construed as limited by such embodiments, but rather construed according to the below claims.

What is claimed is:

1. A method for accessing a database structure, the method comprising:
   generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
   receiving an access request from a computing device connected to a network to access a first entity object, the access request including a requestor identification and a timestamp of the access request;

determining if the requestor identification is substantially similar to a user identification of the plurality of user identifications;

when the requestor identification is substantially similar to a first user identification, determining if the timestamp of the access request falls within the active time interval associated with the obligatory relationship that includes the first user identification; and when the timestamp of the access request falls within the active time interval, granting the access request access to the first entity object.

2. The method of claim 1, wherein the relational database to further include a plurality of entity object attributes that are associated with the plurality of entity objects such that each entity object is associated with one or more entity object attributes.

3. The method of claim 2, wherein the plurality of entity object attributes includes an entity object price.

4. The method of claim 1, wherein the relational database to further include a plurality of permission attributes that are associated with the plurality of permission codes such that each permission code is associated with a permission attribute, the plurality of permission attributes including free shipping.

5. The method of claim 1, wherein generating the relational database includes:

generating a first identification code;

associating the first identification code with an entity object;

associating a permission code with the first identification code;

determining an associated user identification; and establishing an obligated relationship between the first identification code and the associated user identification in the relational database before the access request is received.

6. The method of claim 5, wherein determining the associated user identification includes:

receiving a plurality of inactive identification codes;

receiving an ID request to reserve an inactive identification code from the plurality of inactive identification codes, the ID request including registering user information;

converting an inactive identification code into the associated user identification; and associating the associated user identification with the registering user information in response to the ID request.

7. The method of claim 1, wherein the relational database to further include a plurality of user attributes that are associated with the plurality of user identifications such that each user identification is associated with one or more user attributes.

8. The method of claim 5, wherein determining the associated user identification includes:

receiving multiple requests to obtain data of the first identification code from a plurality of requesting users, wherein the requests to obtain data include identifications of the requesting users; and randomly selecting an identification of a requesting user from the identifications of the requesting users to use as the associated user identification in the relational database.

9. The method of claim 8, further comprising:

receiving a transfer request to transfer the first identification code, wherein the transfer request includes a transferor identification of a transferor that is transferring the permission code associated with the first identification code, and the transferee identification of the transferee that is accepting the permission code associated with the first identification code; and updating, in accordance with the transfer request, a current user identification as the user identification of the transferee that is accepting the permission code.

10. The method of claim 1, further comprising:

generating a notice about a starting point of the active time interval of the obligatory relationship that includes the first entity object; and allocating the notice to the first user identification before the access request is received.

11. The method of claim 1, further comprising discharging the obligatory relationship after the active time interval associated with the obligatory relationship has expired.

12. A method for accessing a database structure, the method comprising:

generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;

receiving an access request from a computing device connected to a network to access a first entity object, the access request including a requestor identification and a timestamp of the access request;

determining if the requestor identification is substantially similar to a user identification of the plurality of user identifications;

when the requestor identification is substantially similar to a first user identification, determining if the timestamp of the access request falls within the active time interval associated with the obligatory relationship that includes the first user identification; and when the timestamp of the access request falls within the active time interval, granting the access request access to the first entity object, wherein generating the relational database includes:

generating a first identification code;

allocating a permission code to the first identification code;

determining an associated user identification;

associating the associated user identification with the first identification code;

receiving a selected entity object selected from a set of multiple entity objects; and associating the selected entity object with the first identification code as an obligated relation in the relational database.

13. The method of claim 12, wherein determining the associated user identification includes:

receiving a plurality of requests to obtain data of the first identification code, each of the plurality of requests including requesting user information;

randomly selecting a request from the plurality of requests; and associating the associated user identification with the requesting user information of the randomly selected request.

14. The method of claim 13, further comprising:
receiving a transfer request to transfer the first identification code, wherein the transfer request includes a transferor identification of a transferor that is transferring the permission code and a transferee identification of a transferee that is accepting the permission code; and
updating a current user identification using the transferee identification in response to the transfer request.

15. A method for accessing a database structure, the method comprising:
generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
receiving an access request from a computing device connected to a network to access a first entity object, the access request including a requestor identification and a timestamp of the access request;
determining if the requestor identification is substantially similar to a user identification of the plurality of user identifications;
when the requestor identification is substantially similar to a first user identification, determining if the timestamp of the access request falls within the active time interval associated with the obligatory relationship that includes the first user identification; and
when the timestamp of the access request falls within the active time interval, granting the access request access to the first entity object,
wherein generating the relational database includes:
obtaining a set of candidate entity objects that include associated attribute information;
calculating index values corresponding to each candidate entity object in accordance with the attribute information using an index rule; and
setting a highest candidate entity object having the highest index value calculated as an entity object.

16. An apparatus for accessing a database structure, the apparatus comprising:
a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
a receiver coupled to the relational database to receive an access request to access a first entity object, the access request including a requestor identification and a timestamp of the access request; and
a processor coupled to the receiver and the relational database, the processor to:
determine if the requestor identification is substantially similar to a user identification of the plurality of user identifications;
when the requestor identification is substantially similar to a first user identification, determine if the timestamp of the access request falls within the active time interval associated with the obligatory relationship that includes the first user identification; and
when the timestamp of the access request falls within the active time interval, grant the access request access to the first entity object.

17. The apparatus of claim 16, wherein the relational database to further include a plurality of entity object attributes that are associated with the plurality of entity objects such that each entity object is associated with one or more entity object attributes.

18. The apparatus of claim 16, wherein the plurality of entity object attributes includes an entity object price.

19. The apparatus of claim 16, wherein the relational database to further include a plurality of permission attributes that are associated with the plurality of permission codes such that each permission code is associated with a permission attribute, the plurality of permission attributes including free shipping.

20. The apparatus of claim 16, wherein the plurality of identification codes includes a first identification code that is associated with an entity object, a first permission code, and an associated user identification.

21. The apparatus of claim 20, wherein:
the receiver to receive an ID request to reserve an inactive identification code from a plurality of inactive identification codes, the ID request including registering user information;
the processor to convert an inactive identification code into the associated user identification, and to associate the associated user identification with the registering user information in response to the ID request.

22. The apparatus of claim 16, wherein the relational database to further include a plurality of user attributes that are associated with the plurality of user identifications such that each user identification is associated with one or more user attributes.

23. The apparatus of claim 20, wherein the processor to:
receive multiple requests to obtain data associated with the first identification code from a plurality of requesting users, wherein the requests to obtain data include identifications of the requesting users; and
randomly select one of the requesting users and use the selected requesting user as the associated user identification in the relational database.

24. The apparatus of claim 23, wherein:
the receiver to receive a transfer request to transfer the first identification code, wherein the transfer request includes a transferor identification of a transferor that is transferring possession of the permission code associated with the first identification code, and the transferee identification of the transferee that is accepting possession of the permission code associated with the first identification code; and
the processor to update a current user identification using the user identification of the transferee that is accepting possession of the permission code associated with the first identification code in response to the transfer request.

25. The apparatus of claim 16, wherein the processor to:
generate a notice regarding a starting point of the active time interval of the obligatory relationship that includes the first entity object; and
send the notice to the first user identification before the access request is received.

26. The apparatus of claim 16, wherein the processor to discharge the obligatory relationship after the active time interval associated with the obligatory relationship has expired.

27. An apparatus for accessing a database structure, the apparatus comprising:
a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
a receiver coupled to the relational database to receive an access request to access a first entity object, the access request including a requestor identification and a timestamp of the access request; and
a processor coupled to the receiver and the relational database, the processor to:
determine if the requestor identification is substantially similar to a user identification of the plurality of user identifications;
when the requestor identification is substantially similar to a first user identification, determine if the timestamp of the access request falls within the active time interval associated with the obligatory relationship that includes the first user identification; and
when the timestamp of the access request falls within the active time interval, grant the access request access to the first entity object,
wherein the processor to associate the first user identification with a first identification code, select an entity object for the first user identification; and associate the selected entity object with the first identification code in the relational database.

28. The apparatus of claim 27, wherein:
the receiver to receive a plurality of requests to obtain data associated with the first identification code, each of the plurality of requests including requesting user information; and
the processor to randomly select one of the identifications of the requesting users to be used as a user identification in the relational database.

29. The apparatus of claim 28, wherein:
the receiver to receive a transfer request to transfer the first identification code, the transfer request including the user identification of the transferor that is transferring the permission information, and the user identification of the transferee that is accepting the permission information; and
the processor to update a current user identification using the user identification of the user identification that is accepting the permission information.

30. An apparatus for accessing a database structure, the apparatus comprising:
a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
a receiver coupled to the relational database to receive an access request to access a first entity object, the access request including a requestor identification and a timestamp of the access request; and
a processor coupled to the receiver and the relational database, the processor to:
determine if the requestor identification is substantially similar to a user identification of the plurality of user identifications;
when the requestor identification is substantially similar to a first user identification, determine if the timestamp of the access request falls within the active time interval associated with the obligatory relationship that includes the first user identification; and
when the timestamp of the access request falls within the active time interval, grant the access request access to the first entity object,
wherein the processor to further:
obtain a set of candidate entity objects that include associated attribute information;
calculate index data corresponding to each candidate entity object in accordance with the attribute information using an index rule; and
set the candidate entity object having a highest index data as an entity object.

31. A computer program product tangibly embodied in a computer-readable storage device and comprising instructions that when executed by a processor perform a method for accessing a database structure, the method comprising:
generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;
receiving an access request from a computing device connected to a network to access a first entity object, the access request including a requestor identification and a timestamp of the access request;
determining if the requestor identification is substantially similar to a user identification of the plurality of user identifications;
when the requestor identification is substantially similar to a first user identification, determining if the timestamp of the access request falls within the active time interval associated with the obligatory relationship that includes the first user identification; and
when the timestamp of the access request falls within the active time interval, granting the access request access to the first entity object.

32. The method of claim 31, wherein the relational database to further include a plurality of entity object attributes that are associated with the plurality of entity objects such that each entity object is associated with one or more entity object attributes.

33. The method of claim 32, wherein the plurality of entity object attributes includes an entity object price.

34. The method of claim 31, wherein the relational database to further include a plurality of permission attributes that are associated with the plurality of permission codes such that each permission code is associated with a permission attribute, the plurality of permission attributes including free shipping.

35. The method of claim 31, wherein generating the relational database includes:
generating a first identification code;
associating the first identification code with an entity object;
associating a permission code with the first identification code;

determining an associated user identification; and establishing an obligated relationship between the first identification code and the associated user identification in the relational database before the access request is received.

36. The method of claim 35, wherein determining the associated user identification includes:

receiving a plurality of inactive identification codes;

receiving an ID request to reserve an inactive identification code from the plurality of inactive identification codes, the ID request including registering user information;

converting an inactive identification code into the associated user identification; and associating the associated user identification with the registering user information in response to the ID request.

37. The method of claim 31, wherein the relational database to further include a plurality of user attributes that are associated with the plurality of user identifications such that each user identification is associated with one or more user attributes.

38. The method of claim 35, wherein determining the associated user identification includes:

receiving multiple requests to obtain data of the first identification code from a plurality of requesting users, wherein the requests to obtain data comprise identifications of the requesting users; and randomly selecting an identification of a requesting user from the identifications of the requesting users to use as the associated user identification in the relational database.

39. The method of claim 38, further comprising:

receiving a transfer request to transfer the first identification code, wherein the transfer request includes a transferor identification of a transferor that is transferring the permission code associated with the first identification code, and the transferee identification of the transferee that is accepting the permission code associated with the first identification code; and updating, in accordance with the transfer request, a current user identification as the user identification of the transferee that is accepting the permission code.

40. A computer program product tangibly embodied in a computer-readable storage device and comprising instructions that when executed by a processor perform a method for accessing a database structure, the method comprising:

generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;

receiving an access request from a computing device connected to a network to access a first entity object, the access request including a requestor identification and a timestamp of the access request;

determining if the requestor identification is substantially similar to a user identification of the plurality of user identifications;

when the requestor identification is substantially similar to a first user identification, determining if the timestamp of the access request falls within the active time interval associated with the obligatory relationship that includes the first user identification; and when the timestamp of the access request falls within the active time interval, granting the access request access to the first entity object, wherein generating the relational database includes:

generating a first identification code;

allocating a permission code to the first identification code;

determining an associated user identification;

associating the associated user identification with the first identification code;

receiving a selected entity object selected from a set of multiple entity objects; and associating the selected entity object with the first identification code as an obligated relation in the relational database.

41. The method of claim 40, wherein determining the associated user identification includes:

receiving a plurality of requests to obtain data of the first identification code, each of the plurality of requests including requesting user information;

randomly selecting a request from the plurality of requests; and associating the associated user identification with the requesting user information of the randomly selected request.

42. The method of claim 41, further comprising:

receiving a transfer request to transfer the first identification code, wherein the transfer request includes a transferor identification of a transferor that is transferring the permission code and a transferee identification of a transferee that is accepting the permission code; and updating a current user identification using the transferee identification in response to the transfer request.

43. A computer program product tangibly embodied in a computer-readable storage device and comprising instructions that when executed by a processor perform a method for accessing a database structure, the method comprising:

generating a relational database, the relational database to include a plurality of user identifications, a plurality of identification codes, a plurality of entity objects, a plurality of permission codes, and a plurality of active time intervals, each user identification having an obligatory relationship with an identification code, an entity object, and one or more permission codes, each obligatory relationship having an active time interval;

receiving an access request from a computing device connected to a network to access a first entity object, the access request including a requestor identification and a timestamp of the access request;

determining if the requestor identification is substantially similar to a user identification of the plurality of user identifications;

when the requestor identification is substantially similar to a first user identification, determining if the timestamp of the access request falls within the active time interval associated with the obligatory relationship that includes the first user identification; and when the timestamp of the access request falls within the active time interval, granting the access request access to the first entity object, wherein generating the relational database includes:

obtaining a set of candidate entity objects that include associated attribute information;

calculating index values corresponding to each candidate entity object in accordance with the attribute information using an index rule; and setting a highest candidate entity object having the highest index value calculated as an entity object.

44. The method of claim 31, further comprising:
generating a notice about a starting point of the active time interval of the obligatory relationship that includes the first entity object; and
allocating the notice to the first user identification before the access request is received.

45. The method of claim 31, further comprising discharging the obligatory relationship after the active time interval associated with the obligatory relationship has expired.

* * * * *